Aug. 16, 1932.  W. C. HEDGCOCK  1,872,449
BRAKE LEVER BRACKET
Filed Aug. 1, 1931
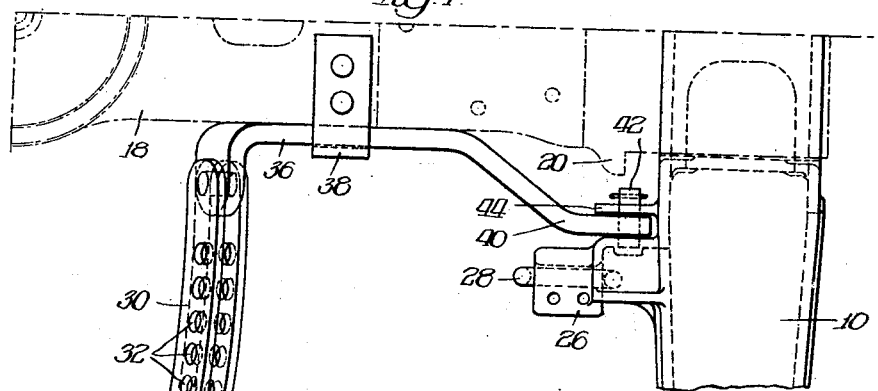
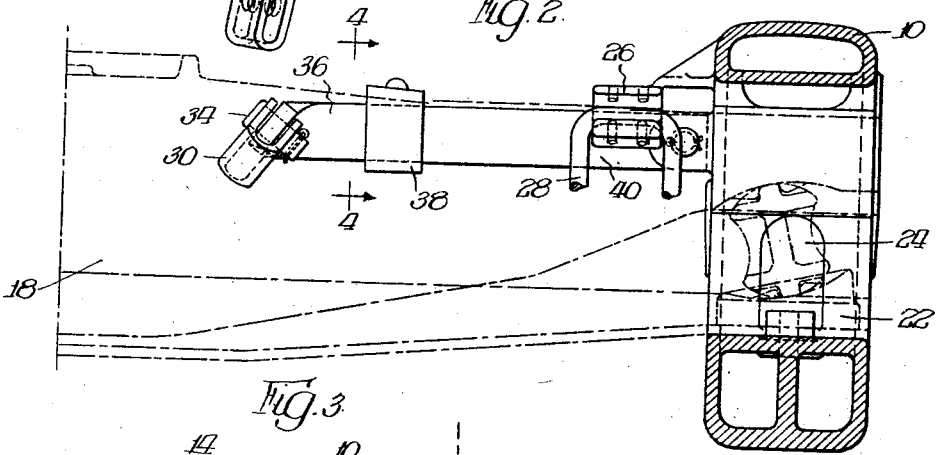
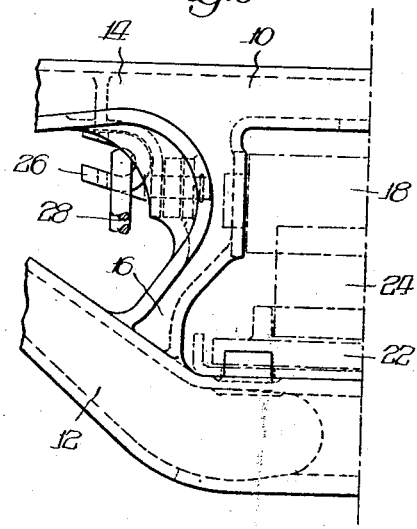
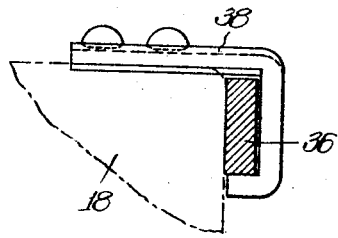
Inventor:
William C. Hedgcock, Patented Aug. 16, 1932

1,872,449

UNITED STATES PATENT OFFICE

WILLIAM C. HEDGCOCK, OF WILMETTE, ILLINOIS, ASSIGNOR TO AMERICAN STEEL FOUNDRIES, OF CHICAGO, ILLINOIS, A CORPORATION OF NEW JERSEY

BRAKE LEVER BRACKET

Application filed August 1, 1931. Serial No. 554,491.

This invention pertains to a truck, and more particularly to a brake lever bracket arrangement for lateral motion trucks.

With car trucks provided with bolsters which are adapted for lateral movement with respect to the side frames, if a dead lever fulcrum bracket were attached rigidly to the bolster in the usual manner, there would be a cramping and dislocation of the brake gear when lateral movement of the bolster took place.

It is therefore an object of this invention to provide a brake lever bracket arrangement which is adapted for use on lateral motion trucks, but wherein the brake reactions are imparted to the bolster in the usual manner.

Another object of the invention is to provide a truck having brake connecting means permitting lateral motion of the bolster, the device being inexpensive to make and maintain, and fulfilling all requirements of manufacture and service.

With these and various other objects in view, the invention may consist of certain novel features of construction and operation as will be more fully described and particularly pointed out in the specification, drawing and claims appended hereto.

In the drawing, which illustrates an embodiment of the device and wherein like reference characters are used to designate like parts—

Figure 1 is a fragmentary top plan view through the bolster and side frame of a car truck showing the application thereto of a brake lever arrangement embodying the invention;

Figure 2 is a transverse sectional elevation through the truck construction shown in Figure 1;

Figure 3 is a fragmentary side elevation of the truck construction shown in Figures 1 and 2;

Figure 4 is a transverse sectional elevation taken substantially in the plane as indicated by the line 4—4 of Figure 2.

The lateral motion truck to which the invention herein is shown applied is similar to forms of trucks shown in Hedgcock and Keysor application Serial No. 552,152, filed July 21, 1931, the truck consisting essentially of the side frame 10 of any construction, the frame shown being of the truss type. This type of side frame is provided with the tension member 12, and the compression member 14 integrally connected thereto at its ends and by means of the column guides 16, the column guides being spaced apart to form an opening for accommodating the load carrying member such as the lateral motion bolster 18 having guiding cooperation with the column guides and being provided with stops 20 for limiting the lateral motion thereof. The side frame is provided with the seat 22 for accommodating the rocker member 24. The side frame adjacent the column guides, is provided with the brake hanger bracket 26, shown as integral therewith, for accommodating the brake hanger 28. In order to provide the proper attachment for a dead lever, the dead lever strap 30 is shown as provided with a plurality of apertures 32 for adjustable pin attachment with the truck brake lever. The dead lever strap is connected by the pin 34 to the elongated bracket 36 which bears against the side of the bolster 18 for imparting brake reactions thereagainst. The bolster is provided with a strap or guide 38 secured thereto and embracing the bracket 36 for providing a guiding support for said bracket.

The outer end of the bracket 36 is offset as at 40 and is detachably connected by the pin 42 to the bracket 26 and the bracket member 44 spaced therefrom providing an opening for receiving the end of the bracket 40, or the bracket 40 may be secured to any other rigid portion of the truck whereby said bracket is held in fixed position transversely or laterally of the truck. By this arrangement the dead lever fulcrum bracket 36 is retained in a fixed position laterally of the truck so that the position of the attached brake lever is not deranged and the brake thrust reaction of the lever is resisted by pressure of the bracket 36 against the side of the bolster. At the same time, the bolster is permitted free lateral motion with respect to the side frame 10, and the lever bracket 36 through the slidable engagement of the bracket 36 between the bolster and the guide 38.

With the construction shown a very simple yet effective construction is provided, though it will be understood that the bracket may be applied between other moving parts of a truck, it being only necessary that it be secured to a fixed part of the truck, and it is also to be understood that I do not wish to be limited by the exact embodiment of the device shown which is merely by way of illustration and not limitation, as varous and other forms of the device will of course be apparent to those skilled in the art without departing from the spirit of the invention or the scope of the claims.

I claim:

1. In a truck, the combination of a side frame, a bolster mounted for lateral movement with respect to said side frame, a brake lever strap disposed adjacent said bolster, and a bracket member connected to said side frame and connected to said strap, said bracket abutting said bolster.

2. In a truck, the combination of a side frame, a bolster mounted for lateral movement with respect to said side frame, a brake lever strap disposed adjacent said bolster, a bracket member connected to said side frame and connected to said strap, said bracket abutting said bolster, and guiding means carried by said bolster and embracing said bracket member.

3. In a truck, the combination of a side frame, a movable member mounted for lateral movement with respect thereto, and a brake lever attachment disposed adjacent and abutting said movable member and secured to said side frame.

4. In a truck, the combination of a side frame, a movable member mounted for lateral movement with respect thereto, a brake lever attachment disposed adjacent and abutting said movable member and secured to said side frame, and guiding means carried by said movable member and embracing said attachment.

5. In a truck, the combination of a relatively fixed member and a transversely movable member, and a brake lever attachment disposed adjacent and abutting said movable member and secured to said fixed member.

6. In a truck, the combination of a side frame, a brake hanger bracket disposed thereon, a bolster mounted for lateral movement with respect to said side frame, and a brake lever attachment secured to said hanger bracket and abutting said bolster.

7. In a truck, the combination of a side frame, a brake hanger bracket disposed thereon, a bolster mounted for lateral movement with respect to said side frame, and a brake lever attachment secured to said hanger bracket and extending inwardly of said truck and abutting said bolster.

8. In a truck, the combination of a side frame, a brake hanger bracket disposed thereon, a bolster mounted for lateral movement with respect to said side frame, a brake lever attachment secured to said hanger bracket and abutting said bolster, and a guide support carried by said bolster and embracing said attachment.

9. In a truck, the combination of a side frame, a brake hanger bracket disposed thereon, a bolster mounted for lateral movement with respect to said side frame, a brake lever attachment secured to said hanger bracket and extending inwardly of said truck and abutting said bolster, and a guide support carried by said bolster and embracing said attachment.

Signed at Chicago, Illinois, this 21st day of July, 1931.

WILLIAM C. HEDGCOCK.